United States Patent
Lee

(10) Patent No.: US 9,752,540 B2
(45) Date of Patent: Sep. 5, 2017

(54) INTEGRATED COOLING SYSTEM AND CONTROL METHOD THEREOF

(71) Applicant: HYUNDAI MOTOR COMPANY, Seoul (KR)

(72) Inventor: Jong Won Lee, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 28 days.

(21) Appl. No.: 14/737,466

(22) Filed: Jun. 11, 2015

(65) Prior Publication Data
US 2016/0138531 A1    May 19, 2016

(30) Foreign Application Priority Data
Nov. 13, 2014  (KR) .......................... 10-2014-0158159

(51) Int. Cl.
F02M 25/00    (2006.01)
F02M 26/29    (2016.01)

(52) U.S. Cl.
CPC .................................. F02M 26/29 (2016.02)

(58) Field of Classification Search
CPC ............. F02M 25/07; F02M 25/0738; F02M 25/0728; F02M 25/0731; F02M 25/0727; F02M 26/29; F01M 5/00; F01P 3/20; F01P 2060/16; F01P 2060/04; F02B 47/08; Y02T 10/121
See application file for complete search history.

(56) References Cited

U.S. PATENT DOCUMENTS

| 4,391,235 A * | 7/1983 | Majkrzak ................ F02N 19/10 123/142.5 R |
| 4,685,430 A * | 8/1987 | Ap ........................... F01M 5/00 123/142.5 R |
| 5,894,834 A * | 4/1999 | Kim ......................... F01N 5/02 123/41.29 |
| 6,062,304 A * | 5/2000 | Kremer ..................... F01P 3/18 165/139 |
| 6,325,026 B1* | 12/2001 | Suzuki .................... F01P 7/165 123/142.5 R |
| 6,360,702 B1* | 3/2002 | Osada ................... F28D 7/0066 123/196 AB |
| 6,454,180 B2* | 9/2002 | Matsunaga ........ B60H 1/00485 165/41 |

(Continued)

FOREIGN PATENT DOCUMENTS

JP    2012-122478 A    6/2012
JP    2012-211511 A    11/2012

(Continued)

*Primary Examiner* — Hieu T Vo
*Assistant Examiner* — Sherman Manley
(74) *Attorney, Agent, or Firm* — McDermott Will & Emery LLP

(57) ABSTRACT

An integrated cooling system includes a temperature adjustment chamber including an intercooler configured to exchange heat between a coolant and compressed air supplied to an engine, an exhaust gas recirculation (EGR) cooler configured to exchange heat between the coolant and an exhaust gas recirculating to the engine, and an oil cooler configured to exchange heat between the coolant and an engine oil. A coolant line is configured to supply coolant to the temperature adjustment chamber and transmit the coolant discharged from the temperature adjustment chamber to the engine.

11 Claims, 4 Drawing Sheets

(56) References Cited

U.S. PATENT DOCUMENTS

| | | | | |
|---|---|---|---|---|
| 6,807,955 B2 * | 10/2004 | Leedham | F02M 26/32 | 123/568.12 |
| 7,467,605 B2 * | 12/2008 | Szalony | F01P 11/20 | 123/142.5 R |
| 7,594,483 B2 * | 9/2009 | Tsuji | F01P 7/165 | 123/41.1 |
| 7,650,753 B2 * | 1/2010 | Muller | F01P 7/165 | 123/41.31 |
| 7,886,988 B2 * | 2/2011 | Schwartz | F01P 7/167 | 123/41.1 |
| 8,205,443 B2 * | 6/2012 | Pegg | F01M 5/001 | 165/276 |
| 8,409,055 B2 * | 4/2013 | Gooden | F01M 5/001 | 165/41 |
| 8,794,299 B2 * | 8/2014 | Barfknecht | F28D 7/1692 | 123/568.12 |
| 8,919,298 B2 * | 12/2014 | Kim | F01P 7/165 | 123/142.5 R |
| 9,259,990 B2 * | 2/2016 | Ishii | B60H 1/00485 | |
| 2008/0264609 A1 * | 10/2008 | Lutz | F28D 7/0091 | 165/104.19 |
| 2009/0090492 A1 * | 4/2009 | Ablitzer | F02B 29/0418 | 165/138 |
| 2009/0283604 A1 * | 11/2009 | Martinchick | B60H 1/00392 | 237/12.3 B |
| 2011/0120396 A1 * | 5/2011 | Myers | F01P 11/08 | 123/41.08 |
| 2011/0159393 A1 * | 6/2011 | Takemoto | B60L 11/1883 | 429/436 |
| 2012/0067545 A1 * | 3/2012 | Yamazaki | F01M 5/00 | 165/52 |
| 2012/0137993 A1 * | 6/2012 | Kim | F01P 7/165 | 123/41.11 |
| 2014/0041643 A1 * | 2/2014 | Han | F02B 47/08 | 123/568.12 |
| 2014/0103128 A1 * | 4/2014 | Patel | B60H 1/00885 | 237/5 |
| 2015/0183296 A1 * | 7/2015 | Ragazzi | B60H 1/03 | 219/205 |

FOREIGN PATENT DOCUMENTS

| | | |
|---|---|---|
| KR | 10-2003-0015478 A | 2/2003 |
| KR | 10-2013-0067099 A | 6/2013 |

* cited by examiner

US 9,752,540 B2

INTEGRATED COOLING SYSTEM AND CONTROL METHOD THEREOF

CROSS-REFERENCE TO RELATED APPLICATION

This application claims the benefit of priority to Korean Patent Application No. 10-2014-0158159 filed in the Korean Intellectual Property Office on Nov. 13, 2014, the entire contents of which are incorporated herein by reference.

TECHNICAL FIELD

The present disclosure relates to an integrated cooling system and a method for controlling the same, and more particularly, to an integrated cooling system capable of collectively controlling temperatures by disposing an intercooler, an exhaust gas recirculation (EGR) cooler, an oil cooler, and a positive temperature coefficient (PTC) heater within a single temperature adjustment chamber, thus enhancing heat exchange efficiency, and a method for controlling the same.

BACKGROUND

In general, various cooling apparatuses are applied to vehicles in order to cool heat generated within an engine. Typical cooling apparatuses include an intercooler, an EGR cooler, and an oil cooler.

The intercooler is a heat exchanger for cooling air when a temperature of air is increased due to compression of a turbocharger. The intercooler is classified into an air cooled type of intercooler and a water cooled type of intercooler, and in order to enhance fuel efficiency in consideration of cooling performance and turbo lag, the water cooled type of intercooler, rather than the air cooled type of intercooler, is applied.

The EGR cooler is an apparatus for cooling a recirculated exhaust gas using a coolant or a cooling wind of an engine. EGR is a method of recirculating a partial amount of an exhaust gas to an intake so that the exhaust gas flows again to an engine combustion chamber. According to this method, a partial amount of oxygen introduced to the engine is replaced with an inert gas, reducing a generation rate of NOx, and a combustion temperature is lowered to restrain generation of NOx. Here, since EGR supplies a high temperature exhaust gas to the intake, a component may be damaged, and thus, in order to cool the exhaust gas, an EGR cooler is additionally provided.

An oil cooler is an apparatus for cooling charged oil to allow a component such as an engine or a transmission to smoothly operate. When oil is heated, viscosity thereof weakens, and the oil having weakened viscosity cannot properly perform a lubricating function. In order to solve this problem, the oil cooler cools oil.

The related art intercooler, EGR cooler, and oil cooler are independently formed and installed in different positions according to purposes of each cooling apparatus. Here, when the cooling apparatuses are independently installed, a space for disposing other components of the engine is reduced and a cooling circuit is complicated. Also, since heat is not transmitted between the cooling apparatuses, it is difficult to effectively control the cooling system.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to establish an integrated cooling system by installing an intercooler, an exhaust gas recirculation (EGR) cooler, and an oil cooler within a single temperature adjustment chamber, and enhance heat exchange efficiency of the cooling apparatuses.

An exemplary embodiment of the present invention provides an integrated cooling system including: a temperature adjustment chamber including an intercooler configured to exchange heat between a coolant and compressed air supplied to an engine, an exhaust gas recirculation (EGR) cooler configured to exchange heat between the coolant and an exhaust gas recirculating to the engine, and an oil cooler configured to exchange heat between the coolant and an engine oil; and a coolant line configured to supply coolant to the temperature adjustment chamber and transmit the coolant discharged from the temperature adjustment chamber to the engine.

In certain embodiments, the integrated cooling system may further include: a heater core configured to discharge a partial amount of heat from the coolant heated in the engine to a vehicle interior; and a radiator configured to cool a remaining portion of heat of the coolant heated in the engine through heat-exchange with ambient air.

In certain embodiments, the integrated cooling system may further include: a first control valve configured to selectively supply coolant which has passed through the heater core or coolant which has passed through the radiator, to the temperature adjustment chamber; a second control valve configured to selectively supply the coolant, which has passed through the heater core, to the first control valve or the engine; a thermostat configured to continuously supply a coolant, which has passed through the engine, to the heater core and selectively supply or not supply the coolant to the radiator; and an EGR valve configured to adjust an amount of exhaust gas recirculating to the engine after passing through the EGR cooler.

In certain embodiments, the integrated cooling system may further include a positive temperature coefficient (PTC) heater configured to selectively heat coolant within the temperature adjustment chamber.

In certain embodiments, the integrated cooling system may further include a controller configured to control the thermostat, the first control valve, the second control valve, the PTC heater, and the EGR valve according to temperatures of the coolant passing through the coolant line.

In certain embodiments, in the integrated cooling system, the intercooler, the EGR cooler, and the oil cooler may be disposed in this order from above to below within the temperature adjustment chamber.

In certain embodiments, the integrated cooling system may further include a backflow preventing valve installed in the coolant line between the engine and the thermostat.

In certain embodiments, when a temperature of the coolant is lower than a reference coolant temperature, the controller may control the thermostat to supply the coolant introduced from the engine to the heater core and not to the radiator, control the second control valve to allow the coolant, which has passed through the heater core, to be introduced to the first control valve, control the first control valve to supply a coolant introduced from the second control valve to the temperature adjustment chamber, operate the PTC heater, and control the EGR valve to increase the temperature of the coolant.

In certain embodiments, when a coolant temperature is higher than the reference coolant temperature, the controller may control the thermostat to supply the coolant introduced from the engine to the radiator and to the heater core, control the second control valve to supply the coolant, which has passed through the heater core, back to the engine, control the first control valve to supply the coolant, which has passed through the radiator, to the temperature adjustment chamber, control the PTC heater to not operate, and control the EGR valve to lower the temperature of the coolant temperature.

In certain embodiments, the integrated cooling system further includes additional EGR valves. In certain embodiments, a coolant temperature sensor is configured to measure a temperature of the coolant and transmit corresponding information to the controller. Another embodiment of the present invention provides a method for controlling an integrated cooling system including a temperature adjustment chamber including an intercooler, an EGR cooler, and an oil cooler to perform heat-exchange with coolant in the chamber, a PTC heater provided in the temperature adjustment chamber and configured to heat the coolant in the chamber, and a radiator configured to exchange heat between coolant heated in an engine with air to cool the coolant leaving the engine. The method includes: determining whether a temperature of the coolant leaving the engine is higher than a reference temperature; and when it is determined that the temperature is not higher than the reference temperature, controlling flow of coolant in the system according to a first operation mode, wherein, in the first operation mode, the coolant heated in the engine does not go through the radiator, and the coolant heated by operating the PTC heater is supplied to the engine.

In certain embodiments, the method may further include, when it is determined that the temperature of the coolant leaving the engine is higher than the reference temperature, controlling the flow of the coolant in the system according to a second operation mode, wherein, in the second operation mode, the PTC heater may not operate and the coolant heated in the engine may be supplied to the engine through the radiator and the temperature adjustment chamber.

DETAILED DESCRIPTION

Figure 1:
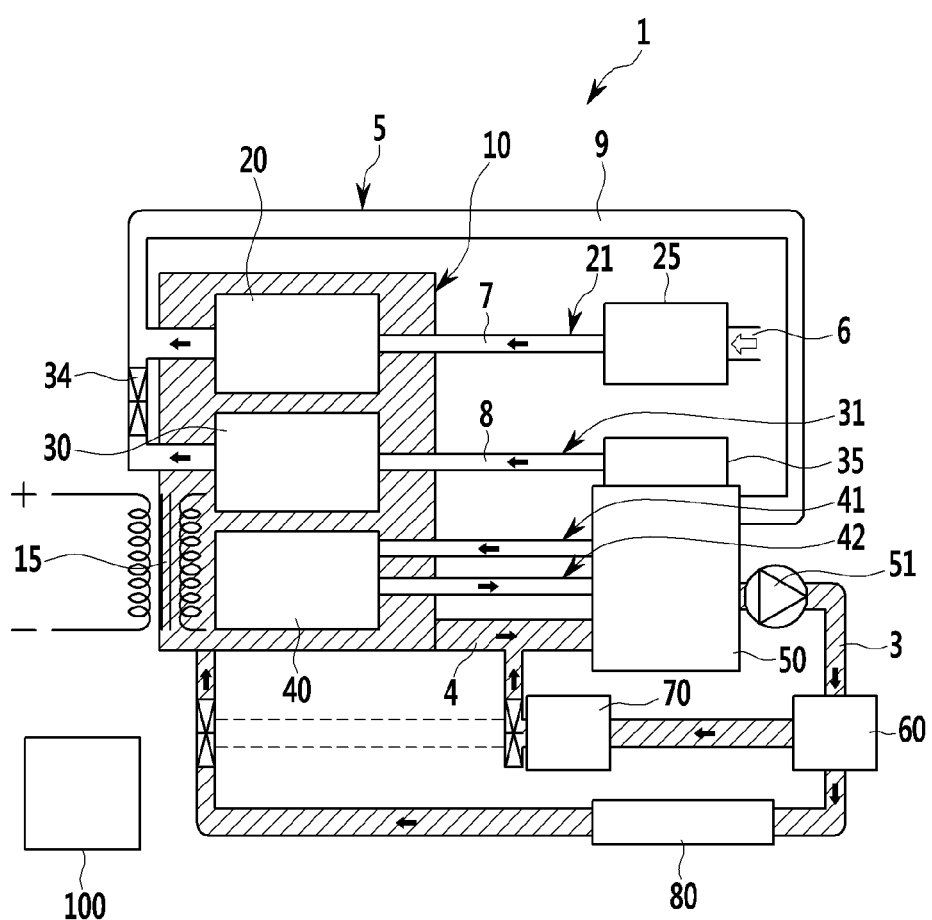
FIG. 1 is a layout view illustrating an operation of an integrated cooling system according to an exemplary embodiment of the present invention when a coolant temperature is higher than a preset temperature after an engine starts.

In the following Detailed Description, only certain exemplary embodiments of the present invention have been shown and described, simply by way of illustration. As those skilled in the art would realize, the described embodiments may be modified in various different ways, all without departing from the spirit or scope of the present invention.

Throughout the specification, unless explicitly described to the contrary, the word "comprise" and variations such as "comprises" or "comprising" will be understood to imply the inclusion of stated elements but not the exclusion of any other elements.

Also, in the drawings, sizes and thickness of components are arbitrarily shown for the description purposes, so the present invention is not limited to the illustrations of the drawings, and the thickness of layers, films, panels, regions, etc., may be exaggerated for clarity.

An exemplary embodiment of the present invention will hereinafter be described in detail with reference to the accompanying drawings.

Figure 2:
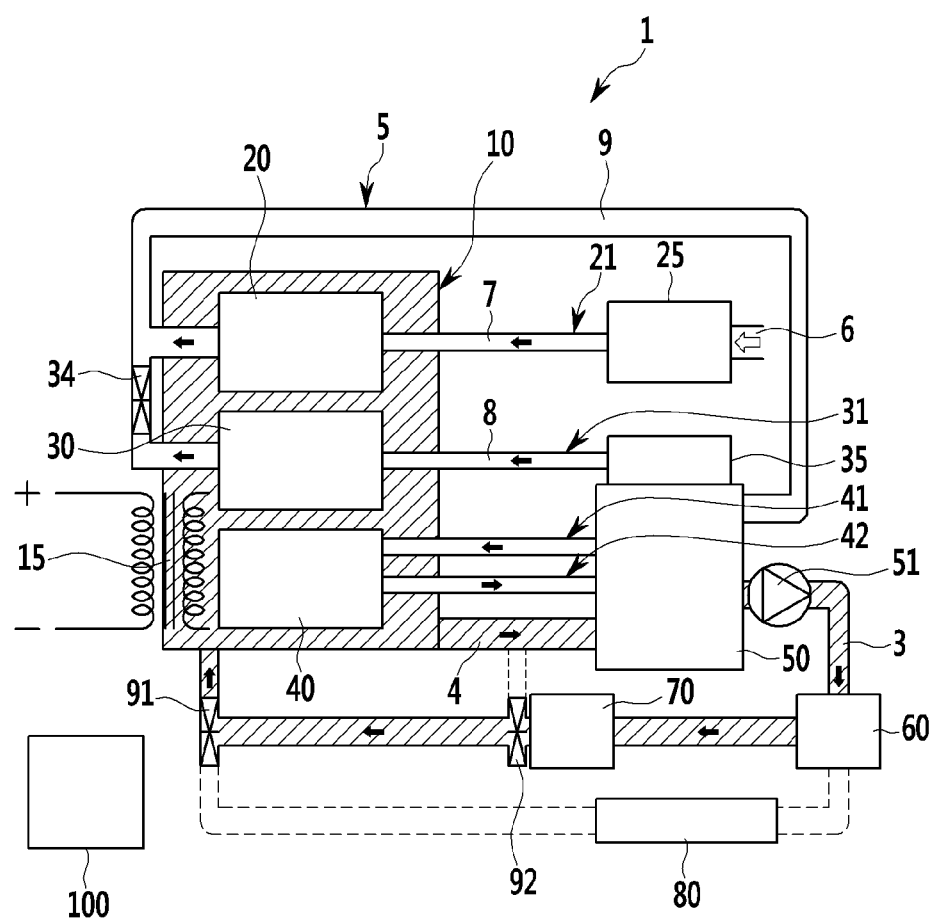
FIG. 2 is a layout view illustrating an operation of the integrated cooling system according to an exemplary embodiment of the present invention when the coolant temperature is lower than a preset temperature after the engine starts.

FIG. 1 is a layout view illustrating an operation of an integrated cooling system according to an exemplary embodiment of the present invention when a coolant temperature is higher than a preset temperature after an engine starts, and FIG. 2 is a layout view illustrating an operation of the integrated cooling system according to an exemplary embodiment of the present invention when the coolant temperature is lower than a preset temperature after the engine starts.

As illustrated in FIGS. 1 and 2, in an integrated cooling system 1, temperatures of fluids supplied to an engine 50 or discharged from the engine 50 are adjusted through heat exchange therebetween.

The integrated cooling system 1 includes a temperature adjustment chamber 10, an intercooler 20, an EGR cooler 30, and an oil cooler 40. In certain embodiments, a heater core 70, and a radiator 80 are included, and in certain embodiments, a thermostat 60 is also included. The temperature adjustment chamber 10, the thermostat 60, the heater core 70, and the radiator 80 may be connected to each other or to the engine 50 through a coolant line 3 continuously or selectively.

The intercooler 20, the EGR cooler 30, and the oil cooler 40 are provided within the temperature adjustment chamber 10. In certain embodiments, an internal space of the temperature adjustment chamber 10 may be filled with a coolant, and heat-exchange is performed with the coolant by the intercooler 20, the EGR cooler 30, and the oil cooler 40. In certain embodiments, the intercooler 20 having the lowest temperature may be positioned in the uppermost portion of the temperature adjustment chamber 10, and the EGR cooler 30 and the oil cooler 40 may be sequentially installed therebelow in this order. Since, in certain embodiments, these components are disposed in order of temperature, starting from that having the lowest temperature, a convection current of a coolant may be activated. However, in certain embodiments, the above components may be disposed in a different order than mentioned above. In certain embodiments, positive temperature coefficient (PTC) heater 15 may be further provided in the temperature adjustment chamber 10.

The intercooler 20 is positioned within the temperature adjustment chamber 10 and, in certain embodiments, may be connected to a turbocharger 25 and a compressed air passage 21. The intercooler 20 may perform heat-exchange between a high temperature compressed air 7 transmitted from the turbocharger 25 and a coolant within the temperature adjustment chamber 10 to cool the high temperature compressed air 7, and may supply cooled intake air 9 to the engine 50 through an intake passage 5. The intercooler 20 may cool the high temperature compressed air to increase density of the air to increase an absolute amount of the intake air 9 supplied to the engine 50 to enhance engine output.

In certain embodiments, the turbocharger 25 compresses ambient air 6 by using an exhaust gas. The compressed air 7 passing through the turbocharger 25 is supplied to the intercooler 20 through the compressed air passage 21.

In certain embodiments, the EGR cooler 30 is positioned within the temperature adjustment chamber 10 and connected to an exhaust manifold 35 and an exhaust circulation passage 31. The EGR cooler 30 may cool exhaust gas 8 introduced through the exhaust circulation passage 31. In certain embodiments, the exhaust gas 8 cooled by the EGR cooler 30 is supplied to the EGR valve 34.

In certain embodiments, the EGR valve 34 is connected to the EGR cooler 30 to adjust an amount of exhaust gas recirculated according to driving conditions of a vehicle. It may configured such that the exhaust gas, which has passed through the EGR valve 34, joins air which has passed through the intercooler 20. That is, the exhaust gas, which has passed through the EGR valve 34, and the air, which has passed through the intercooler 20, may be supplied as intake air 9 to the engine 50 through a single intake passage 5. In the drawing, a single EGR valve 34 is illustrated, but a plurality of EGR valves 34 may be provided in order to enhance precision of control.

In certain embodiments, the exhaust manifold 35 serves to discharge exhaust gas of fuel burned in the engine 50. The exhaust gas 8 discharged from the engine 50 forcibly rotates a turbine of the turbocharger 25 to increase an amount of intake air so as to be used for turbocharging, or may be discharged to the outside through a separate passage (not shown). Also, the exhaust manifold 35 may supply the exhaust gas to the EGR cooler 30 through the exhaust circulation passage 31.

The oil cooler 40 is positioned within the temperature adjustment chamber 10. in certain embodiments, the oil cooler 40 may cool high temperature oil introduced through an oil passage 41 from the engine 40, and resupply the cooled oil to the engine 50 through another oil passage 42.

In certain embodiments PTC heater 15 is provided as an electrical heating element in the temperature adjustment chamber 10 to heat a coolant.

The engine 50 burns a mixture of air and fuel to convert chemical energy into mechanical energy. As illustrated in FIG. 1, in certain embodiments, air which passes through the intercooler 20 and the EGR valve 34 is introduced to the engine 50 through a single intake passage 5 and burnt in the engine 50.

Also, the engine 50 may be cooled by coolant circulating through the coolant line 3. The coolant line 3 includes, in certain embodiments, an integrated coolant line 4 allowing a coolant to be introduced from the temperature adjustment chamber 10 to the engine 50. The coolant introduced by the integrated coolant line 4 is heated, while passing through the engine 50, and the heated coolant is supplied to the thermostat 60 in certain embodiments. In order to prevent the coolant from flowing backward, in certain embodiments, a backflow preventing valve 51 may be installed in the coolant line 3 connecting the engine 50 and the thermostat 60.

In certain embodiments, the thermostat 60 is connected to the heater core 70 to supply at least a partial amount of coolant heated in the engine 50 to the heater core 70 all the time and to selectively supply the remaining portion to the radiator 80.

The heater core 70 is an apparatus for discharging heat of the coolant to a vehicle interior. In certain embodiments, the heater core 70 is selectively connected to the temperature adjustment chamber 10 or the engine 50 through the coolant line 3.

In certain embodiments, the radiator 80 is connected to the temperature adjustment chamber 10 through the coolant line 3, and cools the coolant heated in the engine 50 through heat exchange with ambient air and supplies the cooled coolant to the temperature adjustment chamber 10.

In certain embodiments, the integrated cooling system 1 further includes a first control valve 91 and a second control valve 92 for switching the coolant line 3. In certain embodiments, as the first and second control valves 91 and 92, 3-way valves may be used.

The first control valve 91 is configured to selectively supply a coolant which has passed through the radiator 80 or the heater core 70 to the temperature adjustment chamber 10.

The second control valve 92 is configured to selectively supply the coolant, which has passed through the heater core 70, to the integrated coolant line 4 or the first control valve 91.

In certain embodiments, the integrated cooling system 1 further includes a controller 100 for controlling the thermostat 60, the first and second control valves 91 and 92, the PTC heater 15, and the EGR valve 34. The controller 100 may be configured as one or more processors operated by a set program, and may be programmed to perform each step of a method for controlling the integrated cooling system 1 according to an exemplary embodiment of the present invention.

Figure 3:
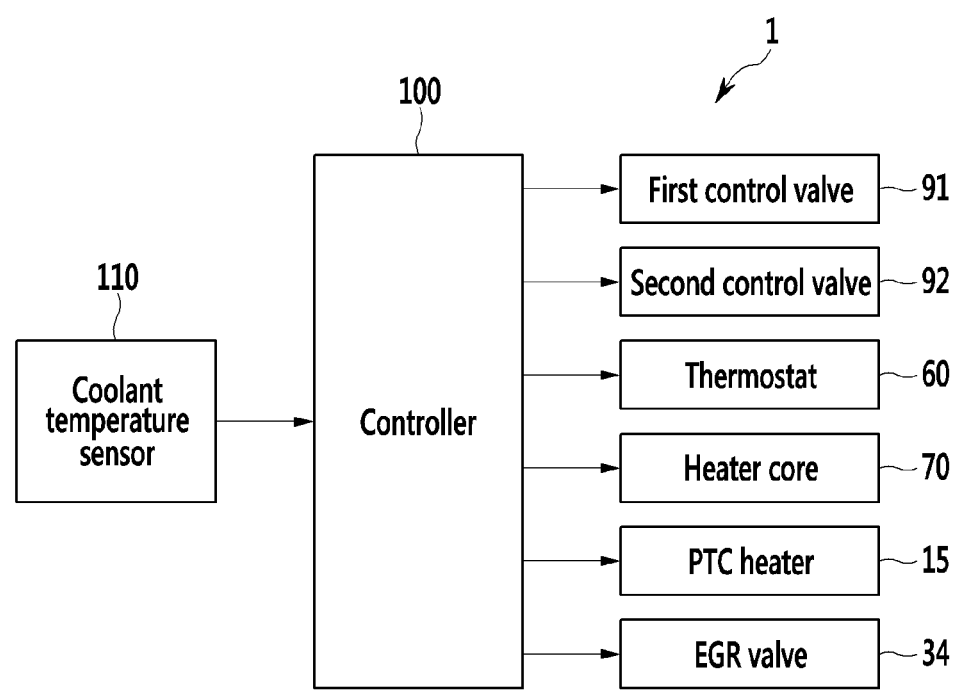
FIG. 3 is a block diagram of an integrated cooling system according to an exemplary embodiment of the present invention.

FIG. 3 is a block diagram of the integrated cooling system according to an exemplary embodiment of the present invention As illustrated in FIG. 3, in certain embodiments, the integrated cooling system 1 further includes a coolant temperature sensor 110.

The coolant temperature sensor 110 may be installed in a set position of the coolant line 3 to measure a temperature of a coolant and transmit corresponding information to the controller 100. The set position may be a position between the engine 50 and the turbocharger 25, but the present inventive concept is not limited thereto.

In certain embodiments, the controller 100 controls the first and second control valves 91 and 92, the thermostat 60, the PTC heater 15, and the EGR valve 34 on the basis of information regarding the coolant temperature transmitted from the coolant temperature sensor 110.

FIG. 2 illustrates an operation when a coolant temperature transmitted from the coolant temperature sensor 110 is lower than a preset coolant temperature. In this case, the coolant which has passed through the engine 50 is introduced to the thermostat 60, and the thermostat 60 closes a coolant passage connected to the radiator 80 and supplies the introduced coolant to the heater core 70. The coolant, which has passed through the heater core, is transmitted to the second control valve 92. The second control valve 92 opens only the coolant passage connected from the heater core 70 to the first control valve 91. The first control valve 91 supplies the coolant introduced from the second control valve 92 to the temperature adjustment chamber 10. In the temperature adjustment chamber 10, the PTC heater 15 may operate to heat the coolant. The heated coolant may be supplied from the temperature adjustment chamber 10 to the engine 50 along the integrated coolant line 4, and a temperature of the coolant and an internal temperature of the engine 50 increase rapidly. Due to the rapid engine warm-up, an engine oil temperature may appropriately rises and a frictional contact may be reduced, enhancing fuel efficiency. In certain embodiments, the EGR valve 34 is controlled to adjust an amount of exhaust gas discharged to the engine to further increase a coolant temperature within the temperature adjustment chamber 10.

In the following descriptions, an operation in which a coolant temperature transmitted from the coolant temperature sensor 110 is lower than a preset coolant temperature will be referred to as a first operation mode.

FIG. 1 shows an operation in which a coolant temperature transmitted from the coolant temperature sensor 110 is higher than the preset coolant temperature. In this case, a high temperature coolant, which has passed through the engine 50, is introduced to the thermostat 60, and the thermostat 60 transmits the coolant introduced from the engine 50 to the heater core 70 or the radiator 80. Heat of the high temperature coolant is supplied to the vehicle interior by the heater core 70. The coolant, which has passed through the heater core 70, is transmitted to the second control valve 92. The second control valve 92 opens the coolant line connected from the heater core 70 to the integrated coolant line 4 and closes the coolant line connected to the first control valve. The coolant cooled, while passing through the radiator 80, is introduced to the first control valve 91, and the first control valve 91 opens only the coolant line connected from the radiator 80 to the temperature adjustment chamber 10. The coolant supplied to the temperature adjustment chamber 10 and cooled therein is supplied again to the engine 50, and here, the PTC heater 15 is controlled to not operate. In certain embodiments, the EGR valve 34 is controlled to further lower the coolant temperature within the temperature adjustment chamber 10 by adjusting an amount of the exhaust gas discharged to the engine.

In the following descriptions, an operation in which a coolant temperature transmitted from the coolant temperature sensor 110 is higher than the preset coolant temperature will be referred to as a second operation mode.

Figure 4:
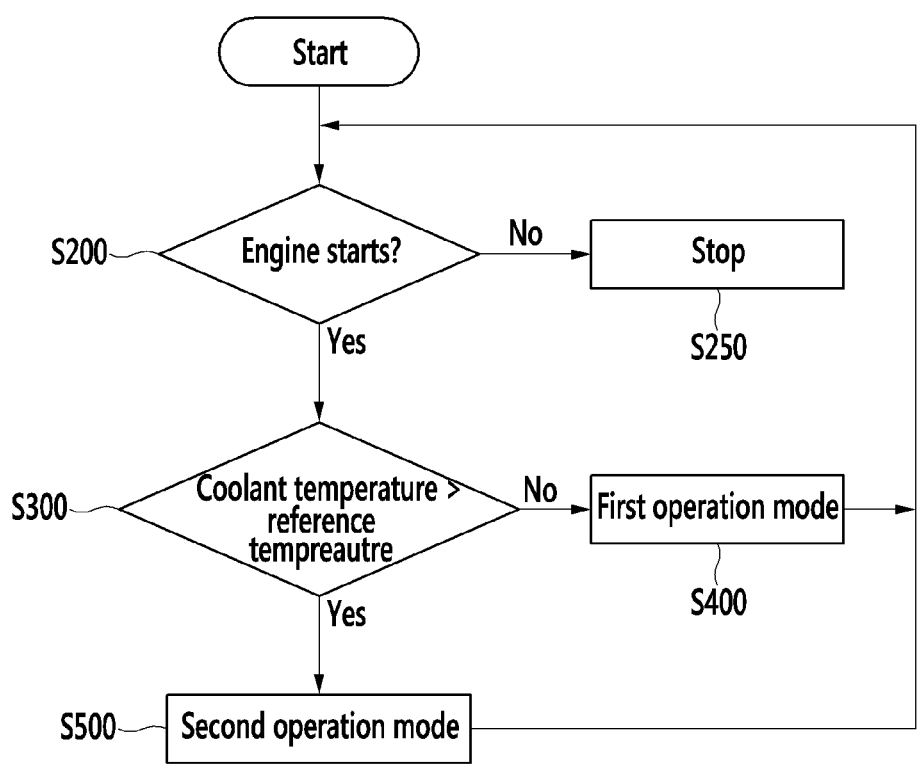
FIG. 4 is a flowchart illustrating a method for controlling an integrated cooling system according to an exemplary embodiment of the present invention.

FIG. 4 is a flowchart illustrating a method for controlling the integrated cooling system 1 according to an exemplary embodiment of the present invention.

As illustrated in FIG. 4, a method for controlling the integrated cooling system according to an exemplary embodiment of the present invention starts by determining whether the engine 50 starts (S200).

When it is determined that the engine 50 does not start in step S200, the method for controlling the integrated cooling system according to an exemplary embodiment of the present invention is terminated (S250).

When it is determined that the engine 50 starts in step S200, the controller 100 compares coolant temperature information transmitted from the coolant temperature sensor 110 with a reference coolant temperature (S300), and controls the first and second control valves 91 and 92, the thermostat 60, the PTC heater 15, and the EGR valve 34 accordingly.

When it is determined that the coolant temperature is lower than the reference temperature (S400), the controller 100 controls the first and second control valves 91 and 92, the thermostat 60, the PTC heater 15, and the EGR valve 34 according to the first operation mode. As described above, the first control valve 91 supplies only the coolant introduced from the second control valve 92 to the temperature adjustment chamber 10, and the second control valve 92 opens only the coolant passage connected from the heater core 70 to the first control valve 91. The thermostat 60 closes the coolant passage connected to the radiator 80 and the PTC heater 15 operates. Here, the EGR valve 34 controls an amount of discharged exhaust gas to increase the coolant temperature.

When it is determined that the coolant temperature is higher than the reference temperature (S500), the controller 100 controls the first and second control valves 91 and 92, the thermostat 60, the PTC heater 15, and the EGR valve 34 accordingly. As described above, the first control valve 91 opens only the coolant line connected from the radiator 80 to the temperature adjustment chamber 10, and the second control valve 92 opens only the coolant line connected from the heater core 70 to the integrated coolant line 4. The thermostat 60 transmits the coolant introduced from the engine 50 to the heater core 70 or the radiator 80, and the PTC heater 15 is maintained in the deactivated state. Here, the EGR valve 34 controls an amount of discharged exhaust gas to lower the coolant temperature.

Meanwhile, the method for controlling the integrated cooling system according to an exemplary embodiment of the present invention may be continuously repeated while the engine 50 is in operation.

According to the exemplary embodiments of the present invention, since the intercooler, the EGR cooler, and the oil cooler are installed in the single temperature adjustment chamber, the required components and production cost may be reduced and an internal space may be secured, compared with the case in which the cooling apparatuses are individually installed. Also, since the cooling apparatuses are integratedly controlled, heat exchange efficiency of each of the cooling apparatuses may be enhanced, and since the heating function to increase a temperature of the coolant, as well as the cooling function, is performed after the engine starts, a warm-up time of the engine can be shortened. Accordingly, engine efficiency may be enhanced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An integrated cooling system for a vehicle comprising:
   a temperature adjustment chamber including an intercooler configured to exchange heat between a coolant and compressed air supplied to an engine, an exhaust gas recirculation (EGR) cooler configured to exchange heat between the coolant and an exhaust gas recirculating to the engine, and an oil cooler configured to exchange heat between the coolant and an engine oil; and
   a coolant line configured to supply coolant to the temperature adjustment chamber and transmit the coolant discharged from the temperature adjustment chamber to the engine,
   wherein the intercooler, the EGR cooler, and the oil cooler are disposed in this order from above to below within the temperature adjustment chamber.

2. The integrated cooling system of claim 1, further comprising:
   a heater core configured to discharge a partial amount of heat from the coolant heated in the engine to a vehicle interior; and
   a radiator configured to cool a remaining portion of heat of the coolant heated in the engine through heat-exchange with ambient air.

3. The integrated cooling system of claim 2, further comprising:
- a first control valve configured to selectively supply coolant which has passed through the heater core or coolant which has passed through the radiator, to the temperature adjustment chamber;
- a second control valve configured to selectively supply the coolant, which has passed through the heater core, to the first control valve or to the engine;
- a thermostat configured to continuously supply coolant, which has passed through the engine, to the heater core and selectively supply or not supply the coolant to the radiator; and
- an EGR valve configured to adjust an amount of exhaust gas recirculating to the engine after passing through the EGR cooler.

4. The integrated cooling system of claim 3, further comprising a positive temperature coefficient (PTC) heater configured to selectively heat coolant within the temperature adjustment chamber.

5. The integrated cooling system of claim 4, further comprising a controller configured to control the thermostat, the first control valve, the second control valve, the PTC heater, and the EGR valve according to temperatures of the coolant passing through the coolant line.

6. The integrated cooling system of claim 3, further comprising a back flow preventing valve installed in the coolant line between the engine and the thermostat.

7. The integrated cooling system of claim 5, wherein, when a temperature of the coolant is lower than a reference temperature,
the controller controls the thermostat to supply the coolant introduced from the engine to the heater core and not to the radiator,
controls the second control valve to allow the coolant, which has passed through the heater core, to be introduced to the first control valve,
controls the first control valve to supply a coolant introduced from the second control valve to the temperature adjustment chamber,
operates the PTC heater, and
controls the EGR valve to increase the temperature of the coolant.

8. The integrated cooling system of claim 5, wherein, when a temperature of the coolant is higher than a reference temperature,
the controller controls the thermostat to supply the coolant introduced from the engine to the radiator and to the heater core,
controls the second control valve to supply the coolant which has passed through the heater core, back to the engine,
controls the first control valve to supply the coolant, which has passed through the radiator, to the temperature adjustment chamber,
controls the PTC heater to not operate, and
controls the EGR valve to lower the temperature of the coolant.

9. The integrated cooling system of claim 3, further comprising additional EGR valves.

10. The integrated cooling system of claim 5, further comprising a coolant temperature sensor configured to measure a temperature of the coolant and transmit corresponding information to the controller.

11. The integrated cooling system of claim 10, wherein the coolant temperature sensor may be positioned to measure the temperature of the coolant between the engine and a turbocharger.

* * * * *